UNITED STATES PATENT OFFICE.

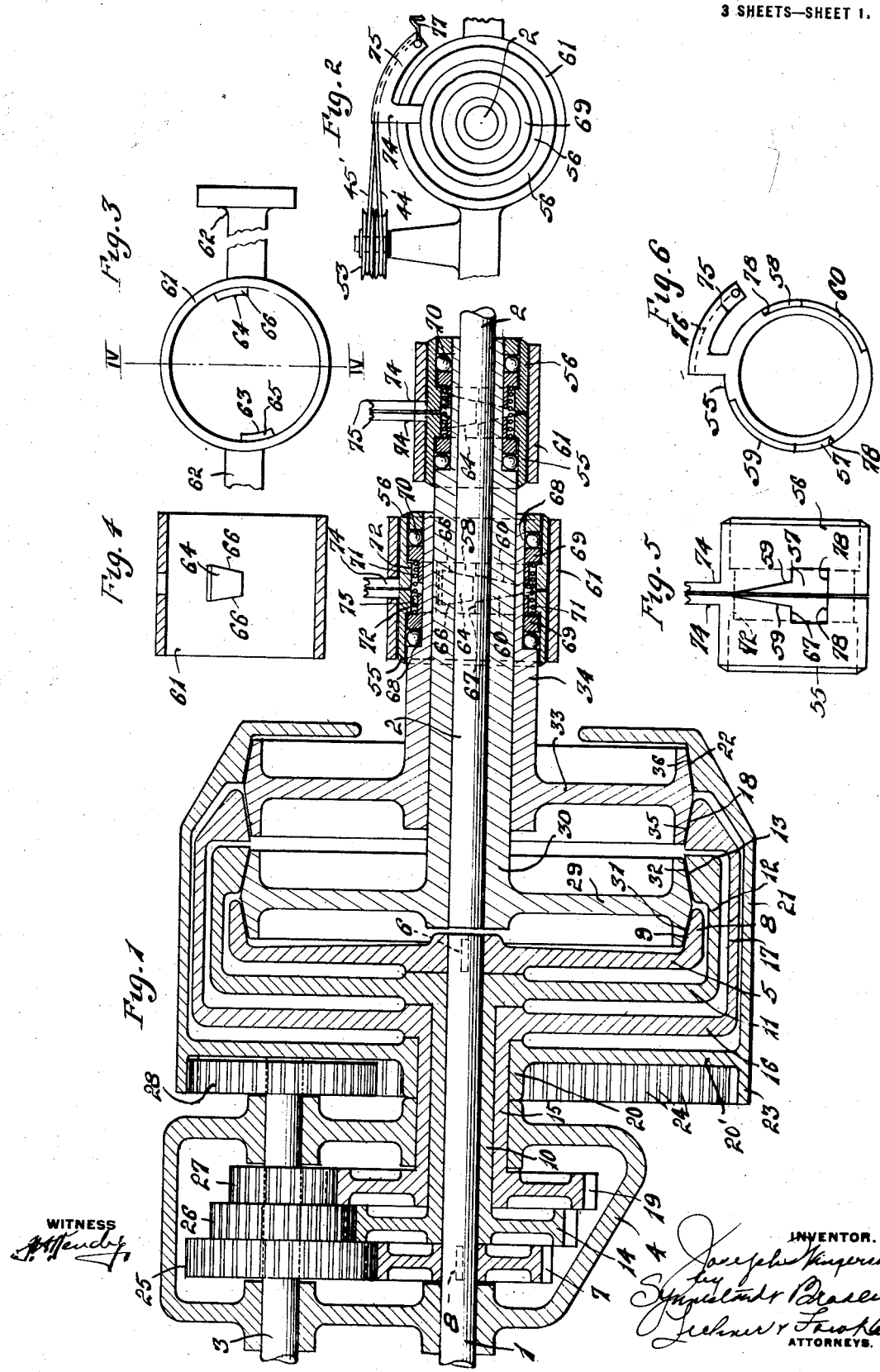

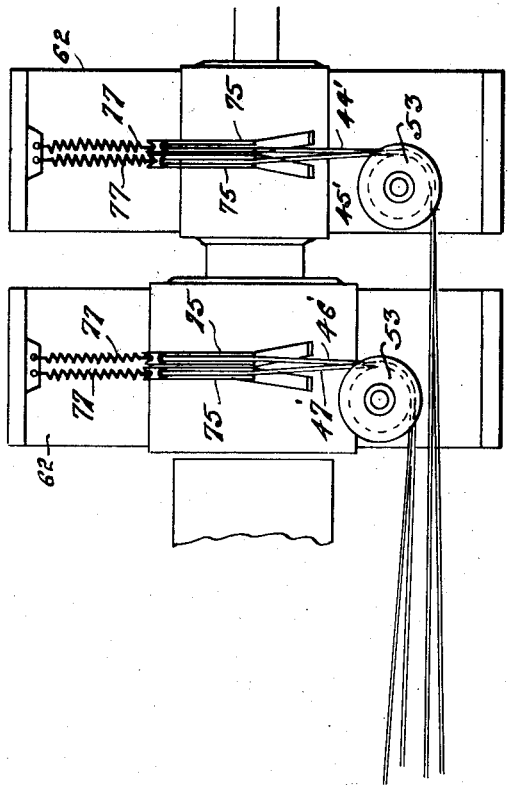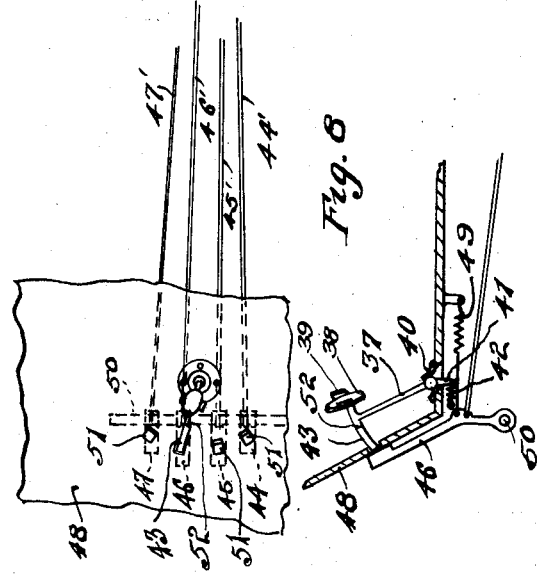

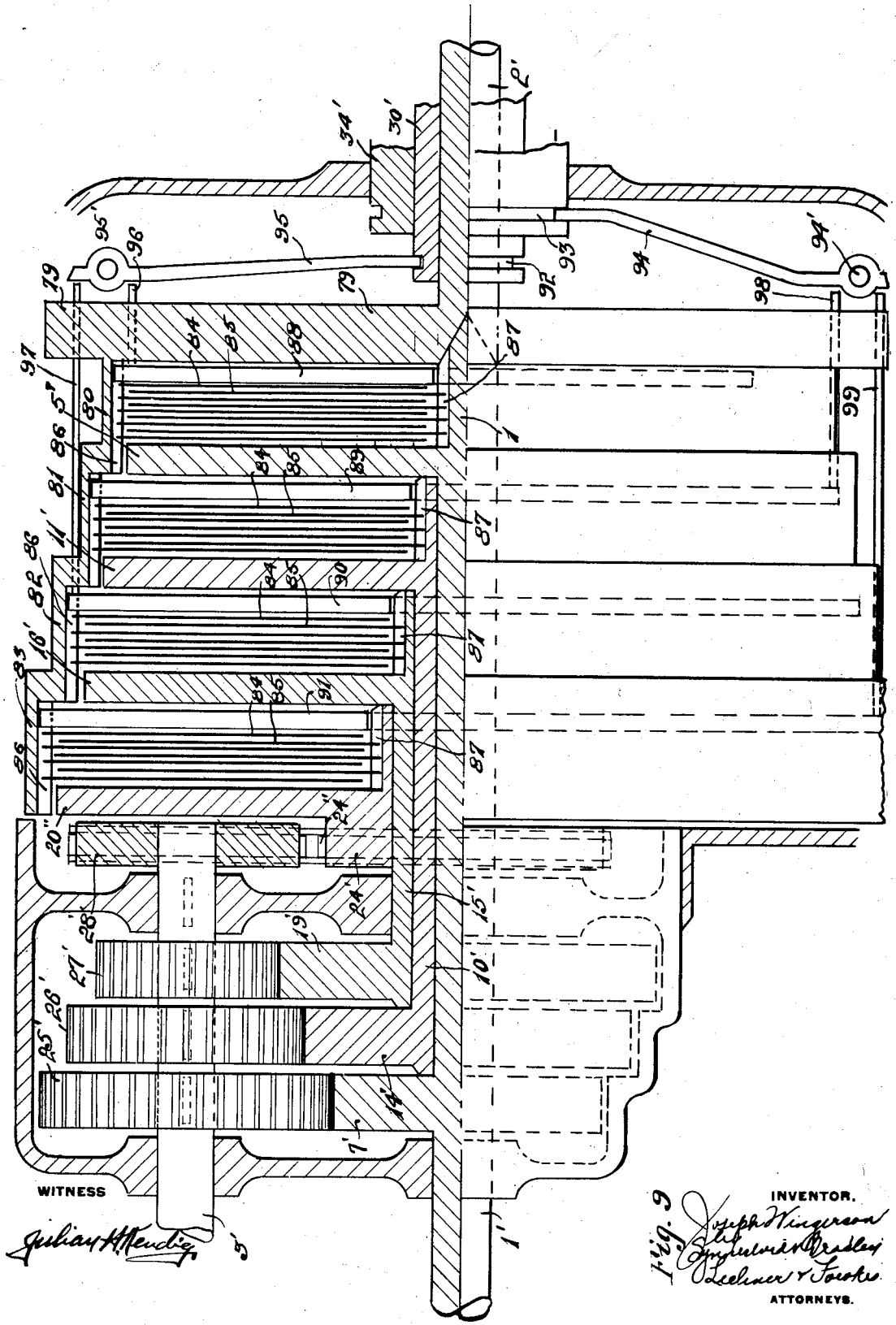

JOSEPH WINGERSON, OF PITTSBURGH, PENNSYLVANIA.

DRIVING MECHANISM.

1,259,817.  Specification of Letters Patent.  Patented Mar. 19, 1918.

Application filed September 4, 1917. Serial No. 189,483.

*To all whom it may concern:*

Be it known that I, JOSEPH WINGERSON, a citizen of the United States, residing at Pittsburgh, in the county of Allegheny and State of Pennsylvania, have invented certain new and useful Improvements in Driving Mechanism, of which the following is a specification.

This invention relates to driving mechanism and more particularly to that class of mechanism used in driving motor vehicles, and has for its principal objects, the provision of a driving connection between the motor shaft and transmission shaft whereby different speeds of rotation may be imparted to the transmission shaft and the speed changed gradually without shock to the engine; the provision of a driving connection wherein the possibility of stripping teeth from the gears is reduced to a minimum through the use of clutches and gears which are constantly in mesh; the provision of a driving mechanism that may be controlled entirely by one lever which may be operated by the foot of the operator so that the operator may keep both hands on the steering wheel at all times; the provision of a simple, efficient, noiselessly operating driving mechanism that may be operated easily and quickly, and such other objects that may hereinafter appear. Certain embodiments of the invention are disclosed in the accompanying drawings, wherein—

Figure 1 is a longitudinal section through the driving connection between the motor shaft and the transmission shaft, showing the clutch mechanism and the clutch shifting apparatus; Fig. 2 is an end view of the clutch shifting mechanism shown in Fig. 1; Fig. 3 is an end view of the fixed cam support and housing for the cam collars; Fig. 4 is a section on the line IV—IV of Fig. 3; Fig. 5 is a side elevation of the cam collars; Fig. 6 is an end view of the left collar of Fig. 5; Fig. 7 is a plan view of clutch shifting mechanism; Fig. 8 is a side elevation of the lever and pedal construction shown in Fig. 7; and Fig. 9 is a longitudinal section through a modified form of driving clutch.

Referring to the drawings, and more particularly to Figs. 1 to 6, 1 is a motor shaft adapted to be driven by any suitable motor; 2 is a transmission shaft which is adapted to be connected to the driving wheels of a vehicle by any suitable driving connection; 3 is an auxiliary shaft or spindle; and 4 is a gear housing which also serves as a bearing for the motor shaft 1 and the auxiliary shaft 3. Adjacent the end of the motor shaft 1, a clutch disk 5 is keyed thereon against relative movement therewith by a key 6, and farther in from the end of the shaft is keyed a small spur gear 7 held fast by the key 8.

The clutch disk 5 is provided with a forwardly extending flange 8 provided on its inner surface with a conical clutch face 9. Between the clutch disk 5 and the spur gear 7 is mounted for rotation a sleeve 10 which carries at the end adjacent the clutch disk 5, a clutch disk 11 provided with a flange 12 extending forwardly and completely surrounding the clutch disk 5. The flange 12 is provided on its inner surface with a conical clutch face 13 having the inclination thereof opposite to the inclination of the clutch face on the disk 5. The two faces are arranged so that they practically form an obtuse angle. The sleeve 10 is provided at the other end with a spur gear 14 of greater diameter than the spur gear 7.

Between the clutch disk 11 and the gear 14 is mounted for rotation upon the sleeve 10, a second sleeve 15 which is provided at its right-hand end with a clutch disk 16 having a forwardly extending flange 17 provided on its inner surface with a conical clutch face 18. It will be noted that this flange entirely surrounds and overlaps the flanges 12 and 8. The other end of the sleeve 15 is provided with a spur gear 19 of greater diameter than the gear 14.

Between the clutch disk 16 and the gear 19 is mounted for rotation upon the sleeve 15, a sleeve 20 carrying a clutch disk 20', which is provided with a forwardly extending flange 21, provided on its inner surface with a conical clutch face 22 alined with the clutch face 18 with the angles thereof forming an obtuse angle. This flange 21 entirely surrounds and overlaps the flanges 8, 12 and 17, and forms a protecting casing for the clutch mechanism within. The clutch disk 20 is provided with a rearwardly extending flange 23 provided on its inner face with teeth 24 forming an internal gear.

Upon the spindle 3 is fixed four gears 25, 26, 27 and 28, the gears 25, 26 and 27 meshing, respectively, with the gears 7, 14 and 19, while the gear 28 which is mounted upon the end of the spindle 3 outside of the casing 4 meshes with the internal gear teeth 24. It will be seen that the rotation of the shaft 1 will cause the spindle 3 to rotate at the same velocity through the medium of the spur gears 7 and 25, which are approximately the same diameter. Because the clutch disk 5 is keyed to the motor shaft 1 it will turn with the shaft. The clutch disk 11 will turn at a slower velocity than the disk 5 because the gear 26 is of smaller diameter than the gear 14 with which it is in mesh, and the clutch disk 16 will turn at a still slower velocity because the gear 27 is considerably smaller than the gear 19 with which it is meshed. The three disks 5, 11 and 16 will all constantly rotate in the same direction when the motor shaft 1 is being turned, but each will have a different speed. The disk 20' will be caused to rotate in a reverse direction, by the gear 28 which is meshed with the internal gear teeth 24, at a velocity considerably under that of the motor shaft 1.

The transmission shaft 2 is driven at different speeds through the medium of the clutch disks just described, the speed of the transmission shaft depending upon which clutch disk is engaged with a clutch member carried by the transmission shaft. A clutch 29 provided with a sleeve 30 is splined upon the transmission shaft 2 so that it may be moved longitudinally thereof. This clutch is provided with two oppositely inclined conical clutch faces 31 and 32 adapted to coöperate respectively, with the clutch face 9 of the clutch disk 5 and the clutch face 13 of the clutch disk 11. It will be seen that if the clutch 29 be moved to the left the faces 31 and 9 will be engaged and the transmission shaft 2 turned at the same speed as the motor shaft 1. If the clutch 29 be moved to the right the clutch surface 32 of the clutch 29 will engage the clutch face 13 of the clutch disk 11 and the transmission shaft 2 will rotate at the same velocity as the clutch disk 11.

A second clutch 33 provided with a sleeve 34 is splined to the sleeve 30 so that it may be moved longitudinally with respect thereto, and this clutch is provided with two oppositely inclined conical clutch faces 35 and 36 which coöperate with clutch faces 18 and 22, respectively. If the clutch 33 be moved to the left the clutch faces 35 and 18 will be engaged and the transmission shaft 2 will rotate with the same velocity as the clutch disk 16. If the clutch 33 be moved to the right the clutch faces 36 and 22 will be engaged and the transmission shaft 2 will be rotated in the reverse direction at the same velocity as the clutch disk 20'.

It will be seen that the speed of the transmission shaft 2 may be varied gradually by gradually increasing the pressure of the clutch against the coöperating clutch disk, and that the speed may be shifted without any danger of stripping the gears as the shock incident to a shifting of speed is greatly reduced.

The clutches 29 and 33 are shifted by levers arranged beneath the floor of the vehicle (see Figs. 7 and 8). The clutch shifting mechanism comprises a foot lever 37 provided with a sole plate 38 which is carried on its upper end. The sole plate is provided with a pair of up-turned flanges 39 adapted to prevent the foot of the operator from sliding off the pedal sidewise. The lever 37 is pivoted in the horizontal floor of the automobile within a universal joint socket 40. A small lever 41 projects beneath the floor and is integral with the lever 37. A spring 42 secured at one end to the floor and at the other end to the end of the lever 41 serves to hold the selective lever 37 in the position shown in Fig. 8. The upper end of the lever 37 is provided with an arc-shaped finger 43 which is adapted to engage shifting levers 44, 45, 46 and 47 arranged beneath the inclined wall 48 of the floor in the front of an automobile. These levers are normally held in the position shown in Fig. 8 by means of the spring 49 secured at one end to the floor and at the other end to the lever above the pivot shaft 50.

The inclined wall 48 is provided with four holes 51 each arranged directly above one of the levers 44 to 47. These holes are provided to permit the arc fingers 43 of the lever 37 to be pushed downward into engagement with any one of the four levers 44, 45, 46 and 47. After any one of these levers has been pushed down by the depression of the lever 37 it may be held in such position by the step 52 on the arc finger 43 engaging the under side of the inclined wall 48. The locking of the lever 37 in its depressed position is done simply by moving the lever 37 to the left by the foot of the operator, so that the step 52 will engage the under side of the inclined wall 48. Movement of the foot to the right slightly will unlock the lever and the spring 41 will pull it back so that the finger 43 clears the inclined wall. The lever 37 may then be shifted to another hole to operate another lever.

Each lever 44, 45, 46 and 47 is connected to the clutch mechanism by means of cables 44', 45', 46' and 47', respectively. These cables extend rearwardly to the clutch mechanism and are reeved around suitable pulleys 53, one for each cable. The ends of the cables are secured to rotary collars which are adapted to manipulate the clutches 29 and 33.

It is the purpose of the invention to provide a means for reciprocating the clutches by the single selective lever 37 through a minimum of movement thereof. It is necessary, therefore, to so connect the clutch levers 44 to 47 so that the operation of each is entirely independent of the others. To accomplish this each clutch lever is connected to a rotary collar provided with a cam surface adapted to coöperate with a fixed cam in such manner as to move the collar longitudinally of its axis and thereby move the clutch sleeve with it.

Referring to Figs. 5 and 6, a pair of collars 55 and 56 are shown. Each collar is provided with two oppositely disposed rectangular recesses 57 and 58 and two oppositely disposed inclined cam surfaces 59 and 60. The collars are supported in a cylindrical casing 61 which is provided with brackets 62 which are secured to the frame of the vehicle (not shown). The inner surface of the cylinder 61 is provided with a pair of oppositely disposed projecting cams 63 and 64.

When the collars are assembled within the cylinder the cam 64 will lie in the recess 58 and the cam 63 will lie in the recess 57. (See Figs. 1, 3, 4, 5 and 6). The cams 63 and 64 are provided with inclined cam surfaces 65 and 66, respectively. Referring to Figs. 1 and 2, it will be seen that if the collar 55 be rotated counter-clockwise the cam surface 60 on the collar will engage the cam surface 66 on the cylinder 61, and that the collar 55 will be cammed to the left, thereby moving the clutch member which it operates to the left. If the collar 56 is rotated counter-clockwise the sleeve will be cammed to the right by reason of the engagement of cam surface 60 of the collar with the cam surface 66 of the cylinder 61. As the cam 64 is stationary and the collars move with the clutch sleeve, the collar 55 will move to the right wiah the collar 56 and the ledge 67 will pass the narrow end of the cam 64 thereby locking it against rotation. Therefore, a clutch may be moved in either direction by depressing the clutch levers connected therewith, and the operation of one lever will not operate or move the other lever.

The collars 55 and 56 are mounted upon the extreme end of the sleeves 30 and 34 upon a combined rotary and thrust bearing which is located in a wide annular groove 68. This bearing comprises a pair of thrust rings 69 rotatably mounted in the groove 68 which are held normally against the antifriction balls 70 by means of a helical spring 71. The inside of the collars 55 and 56 are provided with an annular ridge 72 which extends into an annular groove 73 formed between the thrust rings, which groove carries the spring 71. When the collar 56 is moved to the right the ridge 72 will engage the thrust ring 69 which will move the clutch sleeve to the right. It will be observed that the details of construction of the collars and thrust bearings are the same on both the sleeves 30 and 34, the only difference being in the relative diameters.

Each collar 55 and 56 is provided with an operating lever 74 having an arced pulley segment 75 provided with a groove 76. The ends of the cables 44' and 45' are attached to the pulley segments 75 on the smaller collars 55 and 56, and the cables 46' and 47' are attached to the pulley segments 75 on the larger collars 55 and 56, and it will be seen that if the lever 44 is depressed by the selective lever 37, that cable 44' will be pulled which will rotate the small collar 56 which will cause movement of the clutch 33 to the right, thereby reversing the transmission shaft 2. If the lever 45 is depressed, small collar 55 will be rotated and cause the clutch 33 to be moved to the left, putting the clutch 33 into engagement with clutch face 18 which is the low speed clutch. Depression of the lever 46 will rotate the large collar 56, thereby moving the clutch 29 to the right, engaging the clutch with clutch face 13 which transmits the middle speed to the transmission shaft, and depression of the lever 47 rotates the large collar 55, which moves the clutch 29 to the left thereby engaging the clutch with clutch face 9, which transmits the direct or high speed drive to the transmission shaft.

The collars 55 and 56 are normally held in neutral position by means of springs 77 which are attached at one end to the brackets 62 and at the other end to the pulley segments 75. These springs normally hold the end walls 78 of the recess 57 in engagement with the broad end of the cams 63 and 64 (see Fig. 1), which prevent clockwise rotation of the collars.

It will be seen from the foregoing that complete control is provided by the use of a single selective pedal adapted to be operated by the foot of the operator and that it is impossible for the operator to change speed without first disengaging the clutch.

Referring to Fig. 9 wherein a modified form of clutch mechanism is disclosed, it will be seen that instead of using conical clutch faces friction disks are provided, certain of which are keyed against relative rotary movement with the driving sleeve, while the remainder are keyed against relative rotary movement with respect to the transmission shaft.

Certain parts of the construction of this clutch mechanism are the same as that employed in the clutch just previously described, their similarity being pointed out as follows. 1' is a motor shaft and 2' is the transmission shaft, and 3' is the auxiliary shaft having gears 25', 26' and 27', which are adapted to mesh respectively with gears 7', 14' and 19'. The gear 7' is keyed or secured to the motor shaft 1', the gear 14' is integral with a clutch sleeve 10', and the gear 19' is secured to or integral with a clutch sleeve 15'.

Upon the motor shaft 1' is keyed or otherwise secured thereto, a disk 5', while disks 11' and 16' are integral with the sleeves 10' and 15', respectively. It will be seen that rotation of the motor shaft 1' will cause rotation of the disk 5', 11' and 16' in the same direction, but at relative velocities of rotation. A reverse disk 20'' is mounted for rotation upon the sleeve 15' and is driven reversely to the direction of rotation of the shaft 1' by means of the sprocket 28' mounted upon the auxiliary shaft 3' and a sprocket 24' secured to the reverse disk 21'. The two springs 28' and 24' are connected by a chain 24''.

The disks 5', 11', 16' and 20'' are incased in a housing 79, which is secured to or integral with the transmission shaft 2'. This housing is provided with a series of cylinders 80, 81, 82, and 83, each of a different diameter, and each adapted to receive a plurality of circular friction disks 84 and 85 arranged concentrically about a motor shaft 1. The inner walls of each of the cylinders 82, and 83, are provided with longitudinal ribs or keys 86 which extend into the notched edges of the plates 84, so as to prevent relative rotary movement of the disks 84 with respect to the walls of the cylinder or housing. The end of the shaft 1' and the sleeves 10', 15', and the hub of the disk 20'', are each provided with longitudinal ribs or keys 87 adapted to extend into notches in the center hole of the plates 85 so as to prevent relative rotation of the disks or plates 85 with respect to the motor shaft, the sleeve 10', the sleeve 15', and the hub of the disk 20''.

Each cylinder 80, 81, 82 and 83 is provided with a compression plate 88, 89, 90 and 91, respectively. These plates are adapted to be moved rearwardly toward the motor and are keyed for longitudinal movement within the cylinders by means of the keys or ridges 86. Compression plates as well as the friction disks 84 are all adapted to rotate with the housing 79.

The transmission shaft 2' is provided with two sleeves 30' and 34', to which are secured the reciprocating mechanism, such as shown on the ends of collars 30 and 34 in Fig. 1, as it is the intention to operate this clutch by similar mechanism. The rear ends of the sleeves 30' and 34' are provided with annular grooves 92 and 93, respectively. These grooves 92 and 93 are adapted to receive the ends of the operating levers 94 and 95 which are pivoted to the housing 79 upon pins 94' and 95', respectively. These levers are for the purpose of moving the compression plates 88, 89, 90 and 91 rearward so as to compress the friction disks 84 and 85 into clutching engagement. The compression plate 88 is adapted to be moved rearwardly to operative position by means of the plurality of pins 96, only one of which is shown in the figure. The compression plate 90 is adapted to be moved rearwardly into operative position by means of pins 97, one of which is shown. The compression plates 89 and 91 are adapted to be moved rearwardly into operative position by means of pins 98 and 99, respectively.

When the sleeve 30' is moved to the left the lever 95 will push the pin 96 rearwardly, thus compressing the plates 84 and 85 which are carried by the cylinder 80 and the motor shaft 1'. Therefore, the transmission shaft 2 will be driven at the same speed and in the same direction as the motor shaft. Movement of the sleeve 30', to the right will cause the pin 97 to be pushed rearwardly, thereby moving the compression plate 90 so as to compress the friction disks 84 and 85 carried by the cylinder 82 and the sleeve 15', respectively. This action causes the transmission shaft to be connected to the sleeve 15' which is attached to the low speed disk. Therefore, the transmission shaft 2' will rotate in the same direction as the motor shaft, but at a relatively low speed.

If the sleeve 34' is moved to the left it will cause the pin 98 to move the compression plate 89 rearwardly, thereby connecting the transmission shaft 2' with the sleeve 10' which constantly rotates at a speed between the low speed and the direct speed of the motor shaft 1', and movement of the sleeve 34' to the right will cause the pin 99 to move the compression plate 91 rearwardly so as to compress the disks 84 and 85 carried by the cylinder 83 and the reverse disk 20''. This operation will cause the direction of rotation of the transmission shaft to be the reverse of that of the motor shaft.

While only one of the levers 94 and 95 and the pins 96, 97, 98 and 99 are shown in Fig. 9, for the purpose of clearness, a plurality of such levers and pins are actually used arranged radially about the transmission shaft 2'. It is obvious that this clutch mechanism can be used in connection with the foot pedal mechanism illustrated in Figs. 7 and 8, the same as the clutch mechanism shown in Fig. 1. It is also obvious that many changes may be made in the details of the constructions herein illustrated and described without departing from the spirit of the invention, and the invention is therefore not limited to the specific construction disclosed.

What I claim is:

1. A driving mechanism comprising a rotatable shaft, a pair of clutch members mounted upon the shaft adapted to be relatively rotated by the shaft and provided with opposing oppositely inclined conical clutch faces, a second rotatable shaft alined with the first rotatable shaft, and a clutch member secured thereon against relative rotary movement with respect thereto and having conical clutch faces adapted to alternately engage the clutch faces on the pair of clutches when the clutch faces are relatively reciprocated longitudinally of their axes.

2. A driving mechanism comprising a rotatable shaft, a pair of clutch members mounted upon the shaft adapted to be rotated in a reverse direction by the shaft and provided with opposing oppositely inclined conical clutch faces, a second rotatable shaft alined with the first rotatable shaft, and a clutch member secured thereon against relative rotary movement with respect thereto and having conical clutch faces adapted to alternately engage the clutch faces on the pair of clutches when the clutch faces are relatively reciprocated longitudinally of their axes.

3. A driving mechanism comprising a motor shaft, a pair of clutch members mounted upon the motor shaft adapted to be relatively rotated by the shaft and provided with opposing oppositely inclined conical clutch faces, a transmission shaft alined with the motor shaft, a transmission clutch secured to the transmission shaft against relative rotary movement with respect thereto and having conical clutch faces adapted to alternately engage the clutch faces on the pair of clutches when the clutches are relatively reciprocated longitudinally of their axes.

4. A driving mechanism comprising a motor shaft, a pair of clutch members mounted upon the motor shaft adapted to be relatively rotated by the shaft and provided with opposing oppositely inclined conical clutch faces, a transmission shaft alined with the motor shaft, a transmission clutch secured to the transmission shaft against relative rotary movement with respect thereto and having conical clutch faces adapted to alternately engage the clutch faces on the pair of clutches when the transmission clutch is reciprocated longitudinally of its axis.

5. A driving mechanism comprising a motor shaft, a pair of clutch members mounted upon the motor shaft adapted to be rotated in a reverse direction by the motor shaft and provided with opposing oppositely inclined conical clutch faces, a transmission shaft alined with the motor shaft, a transmission clutch secured to the transmission shaft against relative rotary movement with respect thereto and having conical clutch faces adapted to alternately engage the clutch faces on the pair of clutches when the clutches are relatively reciprocated longitudinally of their axes.

6. A driving mechanism comprising a rotatable shaft, a pair of clutch members mounted upon the shaft adapted to be relatively rotated by the shaft and provided with opposing oppositely inclined conical clutch faces, a second rotatable shaft alined with the first rotatable shaft, a clutch member secured thereon against relative rotary movement with respect thereto and having conical clutch faces adapted to alternately engage the clutch faces on the pair of clutches when the clutch faces are relatively reciprocated longitudinally of their axes, and means for causing relative reciprocation of the clutch faces.

7. A driving mechanism comprising a rotatable shaft, two pairs of clutch members mounted thereon adapted to be relatively rotated by the rotatable shaft, and each pair provided with opposing oppositely inclined conical clutch faces, a second rotatable shaft alined with the first rotatable shaft, and two separate clutch members each adapted to coöperate with one pair of clutch members secured to the second rotatable shaft against relative rotary movement with respect thereto and each having conical clutch faces adapted to alternately engage the clutch faces of its respective pair of clutches when the coöperating clutch faces are relatively reciprocated longitudinally of their axes, one of the clutch members of a pair of clutches on the first rotatable shaft being adapted to extend over and surround all of the other clutch members.

8. A driving mechanism comprising a motor shaft, a clutch disk secured thereto for rotation thereby, and provided with an annular forwardly extending flange carrying a conical clutch face, a sleeve mounted for rotation on the motor shaft, a second clutch disk secured to the sleeve for rotation therewith provided with an annular flange extending over the flange on the first disk and provided with an oppositely inclined conical clutch face, a second sleeve mounted for rotation upon the first sleeve, a third clutch disk secured to the second sleeve and provided with a forwardly projecting annular flange extending over the flanges on the first and second disk and provided with a conical clutch face, a third sleeve mounted upon the second sleeve, a fourth clutch disk secured to the third sleeve and provided with a forwardly projecting annular flange extending over the flanges on the first, second and third disks and provided with an oppositely inclined conical clutch face, an auxiliary shaft, a gear on the auxiliary shaft adapted to turn with the shaft, a gear on the motor shaft adapted to mesh with the gear on the auxiliary shaft to rotate the auxiliary shaft when the motor shaft is rotated, gear connections between the second, third and fourth clutch disks and the auxiliary shaft, whereby two of the disks are rotated in the same direction as the motor shaft and one of the disks is rotated in the reverse direction, a transmission shaft alined with the motor shaft, a sleeve splined to the transmission shaft for longitudinal movement thereon, a transmission clutch member secured to the sleeve having two oppositely inclined conical clutch faces thereon adapted to alternately engage the oppositely inclined clutch faces on two of the disks when reciprocated, a second sleeve splined to the first sleeve on the transmission shaft for longitudinal movement thereon, a second transmission clutch member secured to the second sleeve having two oppositely inclined conical faces thereon adapted to alternately engage the oppositely inclined clutch faces of the remaining two disks, and means for reciprocating the transmission clutches.

9. In driving mechanism, a motor shaft, a transmission shaft, gear means connecting the shafts so that the motor shaft may turn the transmission shaft relatively with respect thereto, including a reciprocable clutch adapted to engage one set of gears when moved in one direction and another set of gears when moved in the opposite direction, a pair of levers adapted to be moved in the same direction to operate the clutch, and means for connecting the levers with the clutch whereby movement of the clutch in one direction by one of the levers does not operate or move the other lever in the opposite direction.

10. In driving mechanism, a motor shaft, a transmission shaft, gear means connecting the shafts so that the motor shaft may turn the transmission shaft relatively with respect thereto, including a reciprocable clutch adapted to engage one set of gears when moved in one direction and another set of gears when moved in the opposite direction, a pair of levers adapted to be moved in the same direction to operate the clutch, and means including a cam for connecting the levers with the clutch whereby movement of the clutch in one direction by one of the levers does not operate or move the other lever in the opposite direction.

11. In driving mechanism, a motor shaft, a transmission shaft, gear means connecting the shafts so that the motor shaft may turn the transmission shaft relatively with respect thereto, including a reciprocable clutch adapted to engage one set of gears when moved in one direction and another set of gears when moved in the opposite direction, a pair of levers adapted to be moved in the same direction to operate the clutch, and means including a fixed cam and a pair of rotatable sleeves coöperating therewith for connecting the levers with the clutch whereby movement of the clutch in one direction by one of the levers does not operate or move the other lever.

12. In driving mechanism, a motor shaft, a transmission shaft, gear means connecting the shafts so that the motor shaft may turn the transmission shaft relatively with respect thereto, including a reciprocable clutch adapted to engage one set of gears when moved in one direction and another set of gears when moved in the opposite direction, a plurality of levers adapted to be moved in the same direction to operate the clutch, a pivoted pedal adapted to alternately engage the levers to move them in one direction, and means for connecting the levers with the clutch whereby movement of the clutch in one direction by one of the levers does not operate or move the other lever.

13. In driving mechanism, a motor shaft, a transmission shaft, gear means connecting the shafts so that the motor shaft may turn the transmission shaft relatively with respect thereto, including a reciprocable clutch adapted to engage one set of gears when moved in one direction and another set of gears when moved in the opposite direction, a plurality of levers adapted to be moved in the same direction to operate the clutch, a pivoted pedal adapted to alternately engage the levers to move them in one direction, means for normally holding the pedal out of operative engagement with the levers, means for locking the pedal in operative engagement with the levers, and means for connecting the levers with the clutch whereby movement of the clutch in one direction by one lever does not operate or move the other lever in the opposite direction.

14. In driving mechanism, a motor shaft, a transmission shaft, gear means connecting the shafts so that the motor shaft may turn the transmission shaft relatively with respect thereto, including a reciprocable clutch member adapted to engage one set of gears when moved in one direction and another set of gears when moved in the opposite direction, a pair of levers adapted to be moved in the same direction to operate the clutch member, and means including a fixed cam for securing the operation of the clutch member from the levers, a rotatable collar for each lever each coöperating with the cam so that they will be moved in opposite longitudinal directions thereby when the collars are rotated in the same direction, and means for connecting the collars with the reciprocable clutch.

15. A driving mechanism comprising in combination, a plurality of rotary clutch members adapted to be rotated at different speeds, an operated clutch member adapted to alternately engage the clutch members for rotation thereby, a plurality of levers for operating the operated clutch member when moved forwardly and a selective lever adapted to alternately engage the levers to move them forward to operative position.

16. A driving mechanism comprising in combination, a plurality of rotary clutch members adapted to be rotated at different speeds, operated clutch members adapted to engage the rotary clutch members for rotation thereby, a plurality of levers adapted to move the operated clutch members into engagement with the rotary clutch members when the levers are moved forwardly, and a selective lever adapted to alternately engage the levers to move them forward to operative position.

17. A driving mechanism comprising in combination, a plurality of rotary clutch members adapted to be rotated at different speeds, operated clutch members adapted to engage the rotary clutch members for rotation thereby, a plurality of levers adapted to move the operated clutch members into engagement with the rotary clutch members when the levers are moved forwardly, means for normally holding the levers in inoperative position, and a selective lever adapted to alternately engage the levers to move them forward to operative position.

18. A driving mechanism comprising in combination, a plurality of rotary clutch members adapted to be rotated at different speeds, operated clutch members adapted to engage the rotary clutch members for rotation thereby, a plurality of levers adapted to move the operated clutch members into engagement with the rotary clutch members when the levers are moved forwardly, means for normally holding the levers in inoperative position, a selective lever adapted to alternately engage the levers to move them forward to operative position, and means for locking the selective lever in operative position.

19. A driving mechanism comprising a plurality of rotary clutch members adapted to be rotated at different speeds, an operated clutch member adapted to alternately engage the clutch members for rotation thereby when reciprocated longitudinally of its axis, a sleeve secured to the operated clutch member, a pair of collars mounted for rotation upon the sleeve and held against longitudinal movement thereon, each provided with an oppositely inclined cam surface, and a fixed cam having surfaces adapted to coöperate with the surfaces on the sleeves whereby rotation of one collar causes it to be moved by the fixed cam longitudinally in one direction and rotation of the other collar causes it to be moved by the fixed cam in the opposite direction.

JOSEPH WINGERSON.